United States Patent [19]

Coueignoux

[11] Patent Number: 4,970,604
[45] Date of Patent: Nov. 13, 1990

[54] SCREEN DISPLAY ENHANCING SYSTEM

[76] Inventor: Philippe J. Coueignoux, 4458 Benhurst Ave., San Diego, Calif. 92122

[21] Appl. No.: 338,980

[22] Filed: Apr. 14, 1989

[51] Int. Cl.$^5$ .............................................. H04N 1/41
[52] U.S. Cl. .................................... 358/426; 358/451; 382/47
[58] Field of Search ............... 358/433, 451, 455, 456, 358/458, 459, 447, 479, 909, 426, 427; 382/47, 56

[56] References Cited

U.S. PATENT DOCUMENTS

| | | | |
|---|---|---|---|
| 3,976,982 | 8/1976 | Eiselen | 358/451 |
| 4,124,870 | 11/1978 | Schatz et al. | 358/433 |
| 4,280,143 | 7/1981 | Judd | 358/451 |
| 4,290,084 | 9/1981 | Minshull et al. | 358/451 |
| 4,394,693 | 7/1983 | Shirley | 358/298 |
| 4,528,693 | 7/1985 | Pearson et al. | 358/451 |
| 4,532,651 | 7/1985 | Pennebaker, Jr. et al. | 358/458 |
| 4,633,503 | 12/1986 | Hinman | 382/47 |
| 4,760,605 | 7/1988 | David et al. | 382/47 |

OTHER PUBLICATIONS

J. Kajiya and M. Ullner: Filtering High Quality Text for Display on Raster Scan Devices, Computer Graphics, vol. 15, No. 3, Aug. 81, pp. 7-15.
A. Naiman and A. Fournier: Rectangular Convolution for Fast Filtering of Characters, Computer Graphics, vol. 21, No. 4, Jul. 87, pp. 233-242.
K. L. Anderson et al.: Binary-Image Manipulation Algorithms in the Image View Facility, IBM J. Res. Dev. vol. 31, No., 1, Jan. 87, pp. 16-31.
I. Kitazawa et al.: Reduction of Image, IBM Technical Disclosure Bulletin, vol. 27, No. 5, Oct. 1984, pp. 3019-3020.
H. Morita et al.: A Resolution Conversion Scheme for Black and White Images, IEEE Global Telecommunications Conference Record, San Diego, CA, 1983 pp. 1255-1260.

Primary Examiner—John K. Peng
Assistant Examiner—Kim Yen Vu
Attorney, Agent, or Firm—Henri J. A. Charmasson

[57] ABSTRACT

An apparatus and method for displaying a digitized document such as a facsimile transmission signal on a low-resolution output device such as the screen of a personal computer. The compressed digital source signal is linearly reduced into an array of pixels by passing the source signal through a filter that groups source pels into clusters. The combined weight of the black or white source pels within each cluster is translated into a grey-scale value for the corresponding target pixel. The determination of the size of the filter domain, and the minimization of source pel duplication within the line are achieved through simple and rapid calculations. Any duplications or source pels resulting from incompatibility between the lengths of a line and the width of a filter domain are evenly distributed by stretching, when necessary, the source runs. The process is further expedited by direct transformation of stretched source runs into target pixels. The device also maintains proportional linearity over the x and y axes.

10 Claims, 8 Drawing Sheets

SCREEN DISPLAY ENHANCING SYSTEM

FIELD OF THE INVENTION

This invention relates to computerized display systems, more specifically to the display of facsimile transmission on video monitors.

BACKGROUND OF THE INVENTION

Facsimile transmission of documents currently is accomplished by means of optical scanners, receivers and printers which have a relatively high black and white resolution of typically 80 to 120 dots per centimeter (200 to 300 dots per inch). By contrast, the resolution of video monitors and other display peripherals which are ordinarily used in connection with business and personal computers range from 25 to 50 dots per centimeters (60 to 120 dots per inch). Accordingly, there are no practical ways to legibly and conveniently receive and display facsimile transmissions on such low resolution systems, except by displaying only a fraction of the facsimile document at a time on the video screen. A facsimile transmission or similarly digitized document can be viewed as a large array (typically 1,728 X 1,075) of elements of information, also called "pels", either black or white. To represent such a document in its entirety on a single screen memory of a personal computer requires scaling down this array into a smaller array (typically 640 X 819) of pels.

Such an operation has received some attention in the past. Reduction methods range from simply discarding preselected rows and columns of pels through combining clusters of pels with or without reference to the values of neighboring pels. The former is disclosed in U.S. Pat. No. 4,280,143 Judd, and the latter in U.S. Pat. No. 3,976,982 Eiselen. Another approach, called "fast projection method" proposed by H. P. Morita et al. in "A Resolution Conversion Scheme for Black and White Images, IEEE Global Telecommunications Conference Record", San Diego, Calif., 1983, pages 1255-1260, takes a weighted average of neighboring pels to assign values to pels in a reduced image. In IBM Technical Disclosure Bulletin, Volume 27, Number 5 Oct. 1984, pages 2984-2986 M. Kikutani proposes a font-scaling method which makes use of geometric reference points and lines in order to scale characters.

Scale-down methods which discard whole pels degrade the readability of the resulting display to an impractical level. Simply combining clusters of pels with a logical OR operation, though very fast and practical, does not yield a much more legible display than discarding whole pels, since no consideration is given in this method to pels which fall in the same cluster as one black pel. More elaborate methods of "cluster combining" fail to achieve the simplicity necessary for speed and cost-efficiency. The best trade-off between speed and quality is described in Eiselen, supra, as a simple counting process of the black pels within a cluster, followed by a thresholding fixed at half the total number of pels within the cluster. However, all prior art methods transform black and white pels into black or white pels. The constraint imposed on them by the binary nature of the output is at the source of either the lack of quality resulting from the discarding of information, or the slowness of the process in view of complex information preserving procedures.

It is also a common feature of all methods described in the prior art, either explictly or implicitly, that the input array is first made available in an incompressed format such as a bit map, which can be directly addressed along its two dimensions, or bit stream, in which each input pel receives a distinct physical representation. However, the most common method of facsimile transmission such as the CCITT Group III handles the digitized document as a compressed signal constituted by a sequence of either black or white runs.

It would be advantageous to have a rapid and efficient apparatus or method to give business and personal computer stations the ability to process facsimile transmissions in their compressed signal form and display them legibly as a whole on a video monitor screen.

SUMMARY OF THE INVENTION

The principal and secondary objects of the invention are to:

provide an effective method for scaling down a digitized documents such as facsimile documents transmitted in the form of black and white pels arrays into smaller pels arrays without significant loss of legibility, to effect this scaling down from a compressed signal without having to spread the signal into a bit map or bit stream of pels, and to achieve such scaling down without undue delay or excessive use of memory space.

These and other objects are achieved by the innovative use of grey-scaling in the representation of the scaled down arbitrary black and white document, by optimizing the filtering operation underlying the grey-scaling conversion of the black and white input, and by working from the black or white runs which are found in the compressed transmission signal rather than from arrangements of the individual pels. The conversion process can be efficiently performed on currently available personal computers in less than three seconds.

DESCRIPTION OF THE PREFERRED EMBODIMENT OF THE INVENTION

Figure 1:
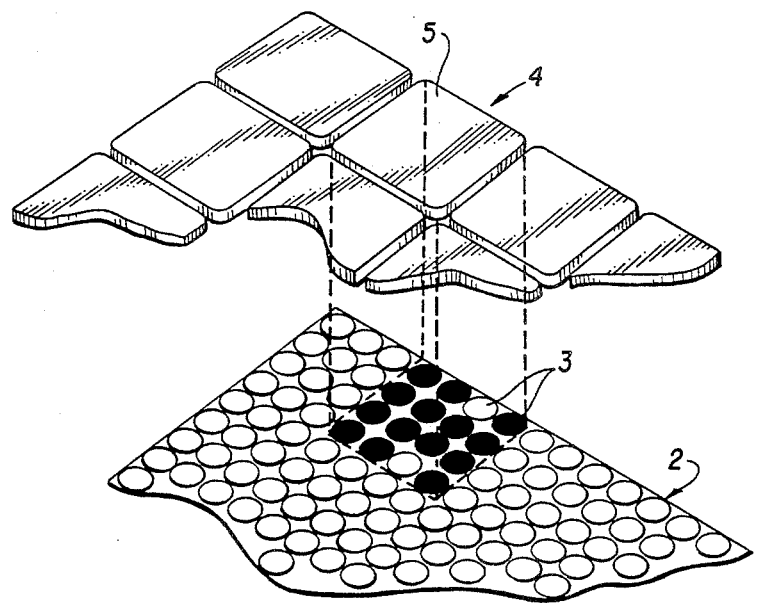
FIG. 1 is a diagrammatical ilustration of the scaling down process.

Referring now to the drawing, the invention will be described in connection with the display on a VGA type video monitor of a letter-sized document digitized and transmitted through facsimile equipment in the CCITT Group III format. The compressed source signal, consisting of successive runs of pels of the same black or white color, may be obtained from the decoding stage of a facsimile receiver.

Let us imagine the digitized document as a large array 2 of black or white source pels 3, and the video monitor bit map memory as a coarser array 4 of equal physical dimensions superimposed onto the original array as shown in FIG. 1. Intuitively, a coarser target pel 5 should be influenced by all the smaller source pels it overlaps and ultimately replaces. If not, some information is lost. On the other hand, though it could be possible to let a target pel be influenced by neighboring source pels it does not overlap, from a computational point of view, the simplest determination is to drive the target pel as a weighted sum of the cluster of source pels it overlaps. It is also desirable that the weights do not depend on the location of the target pel within the document. If one organizes these weights as an array $w(i,j)$ ($1 \leq i \leq sx$, $1 \leq j \leq sy$), the participating source pels are seen to make a rectangle of size $sx \times sy$ called the filter domain associated with the target pel under consideration. Because a source pel can be overlapped by two adjacent target pels, it can fall in two adjacent domains. The invention seeks to minimize such "double dealings" by methodically selecting and adjusting the size or breadth of the clusters.

Figure 2A:
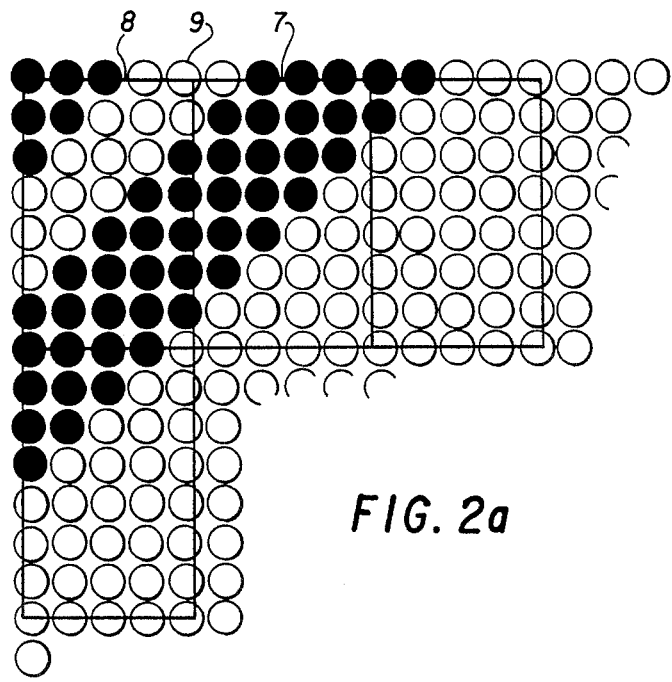
FIGS. 2a, 2b and 2c illustrate the cluster adjustment process.
Figure 2B:
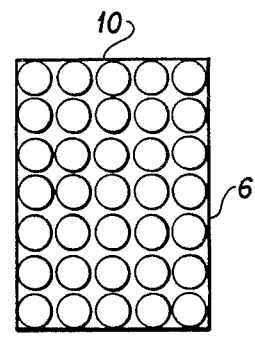
Figure 2C:
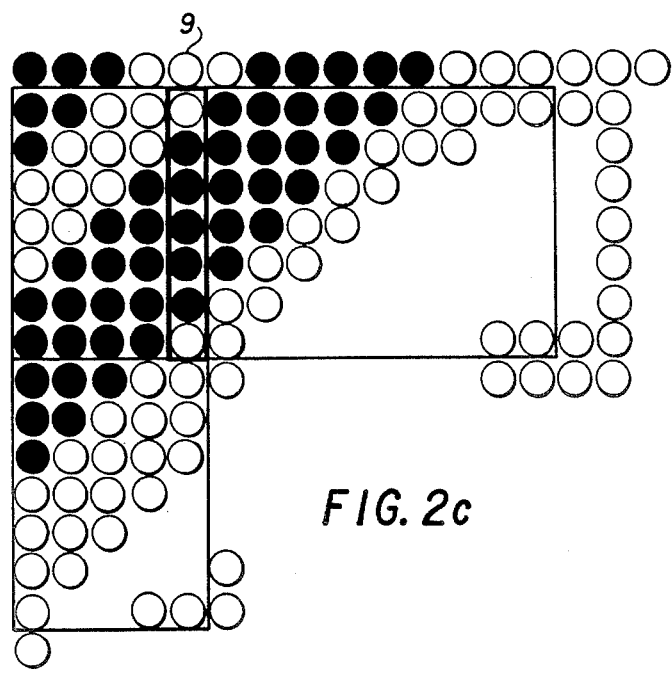

As illustrated in FIGS. 2a, 2b and 2c, this is accomplished through the use of a so-called linear, space-invariant, finite support filter of rectangular shape, and further characterized by the following two factors:

the position of each filter domain 6 associated with a target pel is rectified so as to be aligned with the source pel boundaries;

the overall breadth of the filter domain is such that the union of all the filter domains associated with the target pels covers all the source pels (no gap condition), and that the intersection of the filter domains 7, 8 associated with two neighboring target pels is limited to a fraction of a single row 9 (or column) of source pels, in what is called smallest overlap condition;

For computational efficiency, the invention is further characterized by the following two factors:

the weights of the filter can be written as:
$1 \leq sx$; $1 \leq j \leq sy$: $w(i,j) = u(i)v(j)$
the weights $v(j)$ are either 1 or 2.

So that the basic computation for the weight W of a target pel can be written as:

$$W = \sum_{j+1}^{sy} v(j) \times \left[ \sum_{i=1}^{sx} u(i) \text{ input } (i, j) \right]$$

where input $(i,j) = 0$ or 1

One can see that the inner computations are simple additions of the weights for the source pels where either the black or white source pel equals 1. Furthermore, the outer computation can be carried out by multiplying by 2 the intermediary results for which $v(j)$ is equal to 2, and subsequently adding all the intermediary results together. Note that multiplying by 2 is very efficient on digital machines.

Let m be the x-dimension of the source array, e.g., m=1728, and n be the x-dimension of the target array, e.g., n=640. Let s stand for sx, the x-dimension 10 of the filter domain.

In a no gap condition: $sXn \geq m$

In the smallest overlap condition: $(s-1)) \times n < m$

Therefore, if m is a multiple of n: s=m/n (no overlap at all)

if not: m=nq+r, $0 < r < n$ and s=q+1, meaning that n-r overlaps will have to occur over the n target pels. Trying to spread those overlaps in the most even way is akin to drawing a digital straight line from (0,0) to (n,r) on a unit grid, according to Brons' algorithm (see "Fundamental Algorithms for Computer Graphics" R. A. Earnshaw, Editor NATO ASI Series, F, Vol. 17, 1985), where the (n-r)overlaps correspond to the (n-r) elementary (+1,0) moves.

Figure 3:
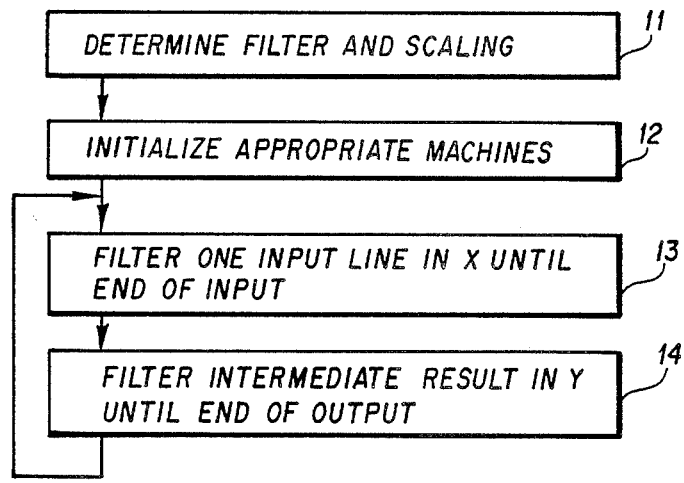
FIG. 3 is a flow diagram of the overall process.

The basic process is illustrated in FIG. 3 as four successive steps 11, 12, 13 and 14. In order to determine 11 the filter and scaling factors, let $mx \times my$ be the dimensions of the underlying black and white pel rectangular array source 2. Let $nx \times ny$ be the dimensions of the underlying rectangular array or bit-map 4 of target pels.

$mx > nx$ and $my > ny$ e.g. $mx = 1728$ (Group III facsimile standard)

$nx = 640$ (IBM personal computer so called VGA standard)

$my = 1100$ and $ny = 815$

The width of the filter domain becomes $$sx = (mx + nx - 1)/nx$$
$$\text{e.g.} \quad sx = (1728 + 640 - 1)/640 = 3$$

Typical values of sx for practical applications are 2,3, 4.

The length sy of the filter domain is obtained in a similar manner, or preferably in a way that insures that a square shape on the input document will look square on the output display. To achieve the latter, let ri and ro be the so-called aspect ratios of the input and outputs arrays. ri and ro are such that an input rectangle of size (1,ri) as expressed in input array units and an output rectangle of size (1,ro) as expressed in output array units look square to a human observer.

Then select sy as the smallest integer greater or equal to $(mx \times ri)/(nx \times ro)$ e.g. $ri = \frac{1}{2}$, $ro = 1$ with same $mx$ and $nx$ as above $sy = (1728 \times \frac{1}{2})/(640 \times 1) = 2$ Given the filter breadth $sx \times sy$, one can select the filter weights according to the following formula:

$1 \leq i \leq sx$; $1 \leq j \leq sy$: $w(i,j) = u(i) \times v(j)$ $v(j)$ is either 1 or 2.

A preferred way is to use a table of prerecorded choices covering a range of possibilities valid for both the x and y directions.

| e.g. for m/n within | ]1, 1.5] | weights are | 2,1 |
|---|---|---|---|
| | ]1.5, 2 ] | | 1,1 |
| | ]2, 2.5] | | 1,2,1 |
| | ]2.5, 3 ] | | 1,1,1 |
| | ]3, 3.5] | | 1,2,2,1 |
| | ]3.5, 4 ] | | 1,1,1,1, |

If mx is an exact multiple of nx, note that there is no overlap in x and that the overlap monitoring mechanism can be bypassed. A similar decision is made on my/ny or $(mx \times ri)/(nx \times ro)$. If my is an exact multiple of ny, the skip count is always sy and the skip monitoring mechanism is reduced to a simple counter.

If a remainder rx occurs, the parameters proper to drive a straight line from (0,0) to (nx, rx) are computed according to the method retained to draw a straight line. The preferred method is described by Cederberg in A New Method for Vector Generation, Computer Graphics and Image Processing, Vol. 9, 1979, pp. 183-195. A similar subprocess is carried out in the y direction.

e.g. m=1728, n=640: (n,r)=(640,448)

The process is therefore further characterized by a choice of:

filter breadth determined by dividing the x dimension of the source array by the x dimension of the target array, and taking the quotient, incremented by one if the division yields a remainder; and filter domains presenting evenly spread overlaps, whose successive positions in one direction are governed by any digital straight line algorithm capable of drawing a digital line from (0,0) to (n,r), where n is the target array dimension in that direction and r the remainder of the corresponding division as defined above.

Note that the overlaps can be described in two different ways:

an overlap happens when the last source pel contributing to a target pel is "duplicated" as the first source pel contributing to the next target pel in a given direction, or an overlap happens when the last source pel contributing to a target pel is one step less than the filter breadth after the last source pel contributing to the previous target pel.

The first interpretation focuses on source pel duplication, the second in source pel skipping.

Drawing a digital straight line from (0,0) to (m,n) (following the notations already introduced) is reduced by Bron's algorithm to the same problem from (0,0) to (n,r). This can be seen as a simpler way of scaling down from m to n as drawing a line from (0,0) to (n,r). Note that the filter domain could be calculated starting from its length sy rather than its width sx.

The process requires the use of four types of "Machines", one for x-filtering, one for x-duplication, one for y-filtering and one for y-skipping. Each machine type can be made to handle a range of options but the preferred way is to specialize each machine, and either introduce a set of machines of one type to cover all the possibilities of this type, (e.g. three x-filtering machines for sx=2,3 and 4, or specialize the embodiment to a particular option (e.g. only one x-duplication machine for (nx,rx) equal to (640,448).

When a set of machines of a particular type is implemented, one must first select the appropriate machine, and then load the appropriate initial parameters in the machine thus selected.

Figure 4:
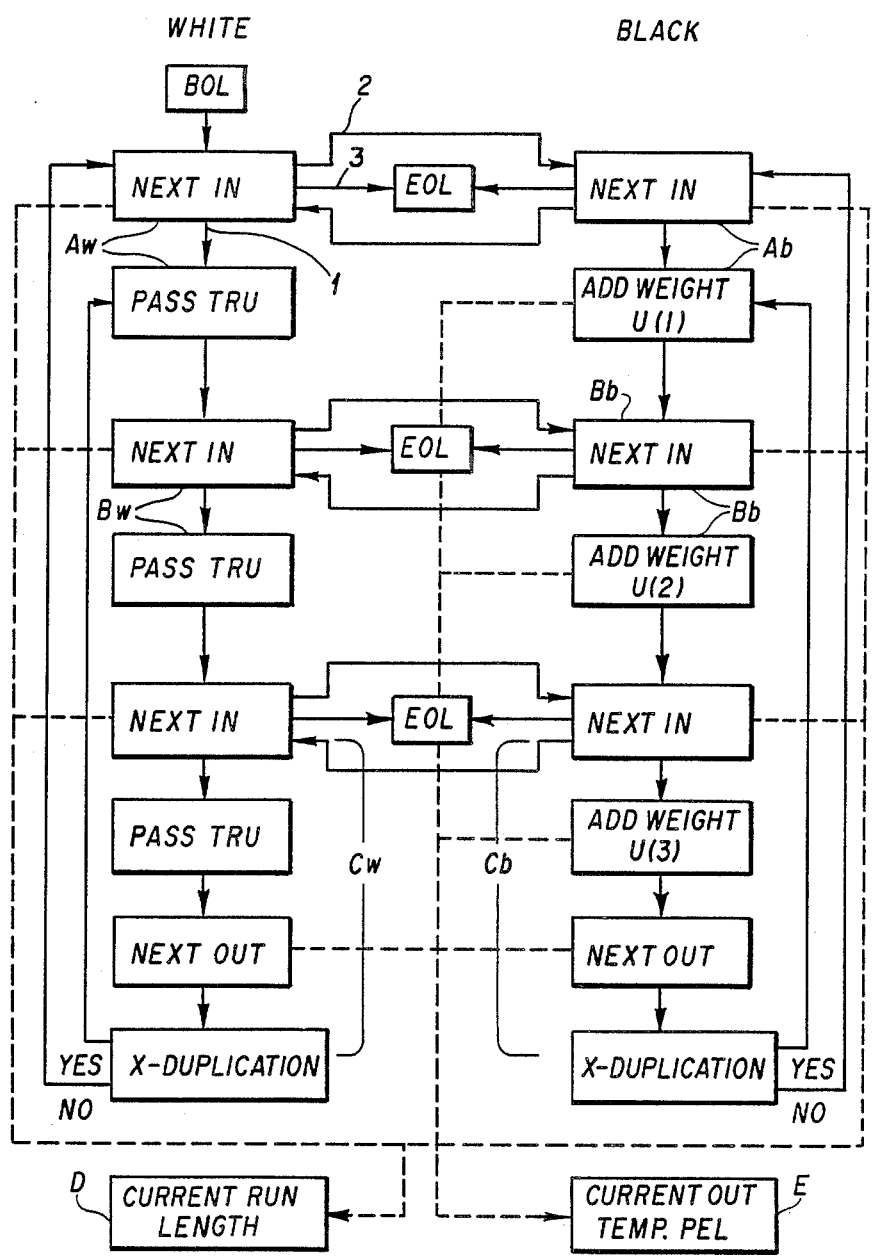
FIGS. 4, 4a and 4b is a flow diagram of an x-filtering machine.

FIG. 4 illustrates the operation of an x-filtering machine for sx=3. X-filtering machines for sx=2+t can be easily constructed from this model by setting the number of intermediate states B to t. In FIG. 4, t=1.

It is further assumed in this implementation that white source pels are assigned a 0 value. At initialization, weights u(1), u(2) and u(3) are therefore loaded only in the half of the machine corresponding to black source pels.

Figure 5:
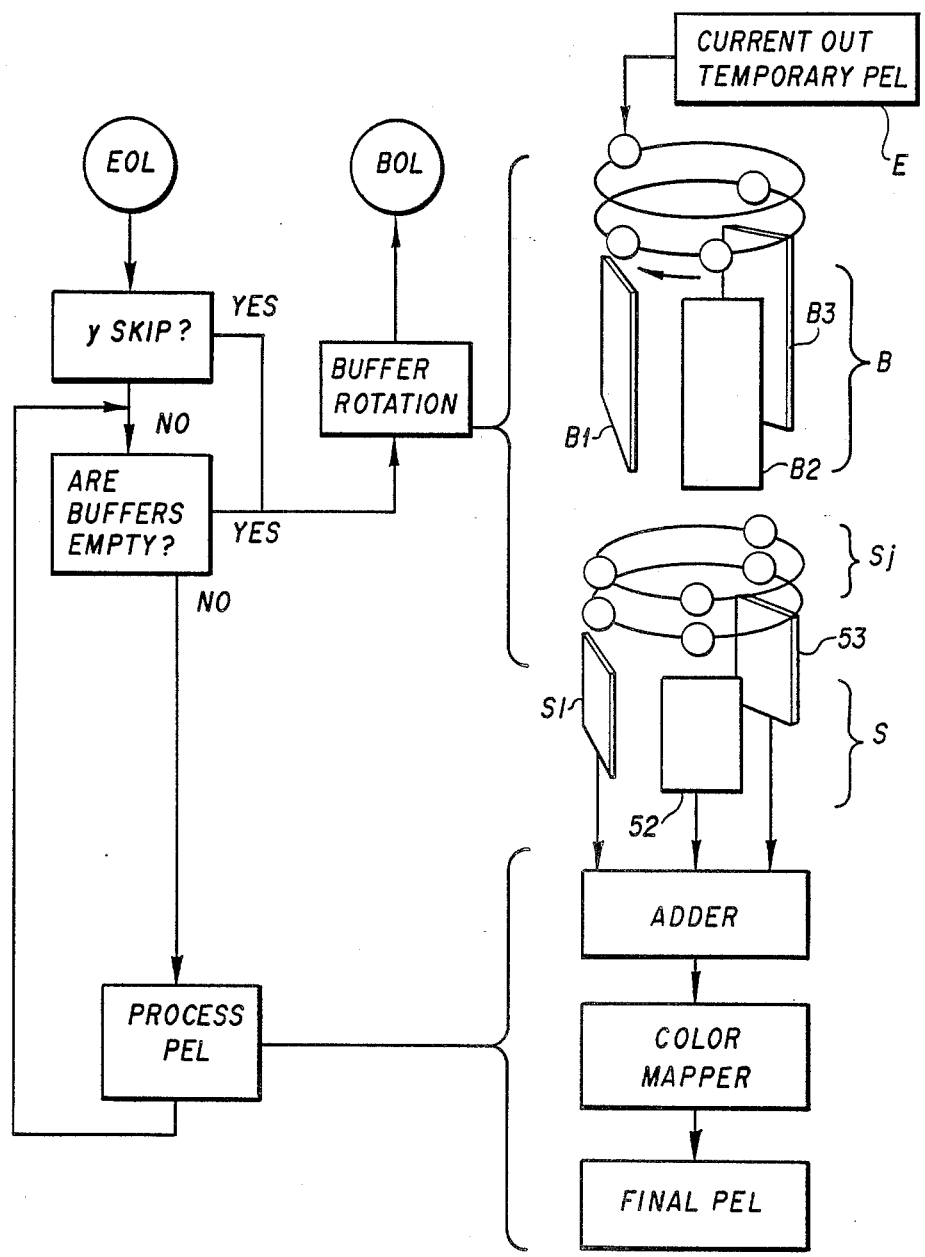
FIG. 5 is a block diagram of a y-filtering machine.

FIG. 5 illustrates the operation of a y-filtering machine for sy=3. Y-filtering machines for any sy can be easily constructed from this model by setting the number of intermediate buffers B and multipliers or shifters S to sy. In FIG. 5, sy=3.

At initialization, whenever the weight v(j) is equal to 1, the shifter Sj is deactivated, if v(j)=2, Sj is activated. Buffer B1 is further put in correspondence with the register containing the temporary pel at one end and the shifter S1 at the other.

A preferred construction for a general x-duplication or y-skip machines is given by Cederberg in "A New Method for Vector Generation", supra. It is made entirely of counters, comparators and other simple logical operations.

Further simplicity is achieved by specializing the machine to a particular scale factor whenever appropriate.

Whenever possible one may use duplicating and skipping machines made out of single step rotating registers. If a 1 value is input into such a p-bit register, the register can be used to generate an event every pth time; this replaces a counter initialized to p in Cederberg's implementation with the added advantage that the p-bit register is self-reinitializing, while the counter has to be reinitialized each time it counts down to 0. Whenever the length of rotating registers is limited by the architecture of the implementation to some numbers as 8, 16 or 32, it is still possible to simply implement the process for counter values equal to or inferior by one to, available lengths. FIG. 4c shows how to implement an x-duplicating machine for the case (640,448), which calls for two counting processes with a factor 3, together with its initial state.

According to Cederberg or Brons:

640−448=192 and 640/192=10/3=3 and 1 remainder.

Thus, overlaps should occur every third output pel but one in three should be at the fourth output pel. A 8-bit "ding" register is loaded with 00100010 and a 8-bit "dong" register is loaded with 10001000. The ding and dong registers are then rotated as shown in the diagram of FIG. 4c to synchronize the placement of the overlaps.

Once initialized properly, the machines accept the delivery on demand of the next current run length in the x direction of the input signal, as can be obtained for example from a decoding stage of the modified Huffman code of the CCITT Group III facsimile standard. Successive runs of the same color, if allowed in the input signal, must be collapsed into a single run. End of Line runs must be replaced by a final null run positioned anywhere after the first run, which may be zero itself. After reaching this component, the process first generates a beginning of line signal BOL.

When the beginning of line signal is generated, the current run length counter D is initialized with the first run length of the next source line and the current output temporary register E is reset to 0. Also, the two x-duplication machines in stages Cw and Cb are reinitialized.

Figure 4A:
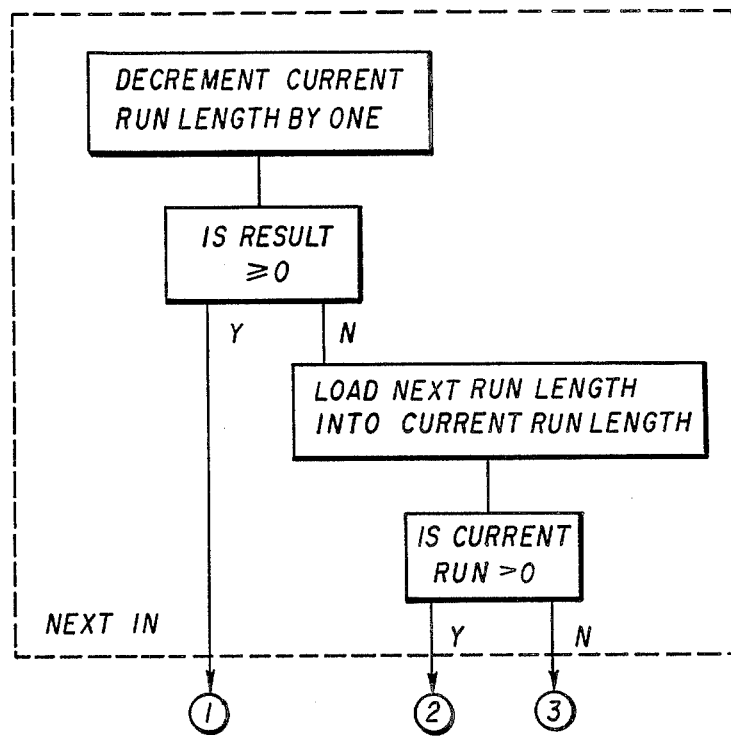

The Next In subprocess, described in FIG. 4a, absorbs one input pel by decrementing the current run length register D. If there is no available input pel in the current run, it fetches the next current run into D and switches to the opposite color side of the machine, unless a nul run length forces an end of line signal EOL.

The Pass-Thru subprocess does nothing, while the Add Weight u(i) simply adds u(i) to the current output temporary register E.

Figure 4B:
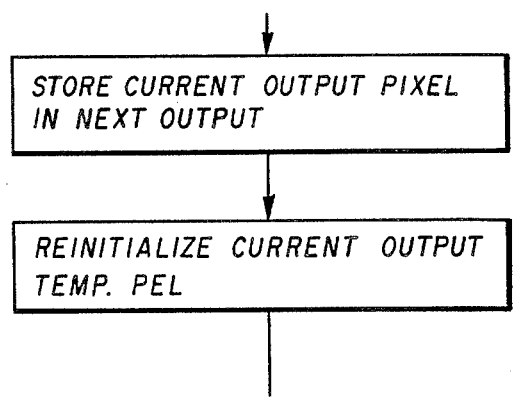
Figure 4C:
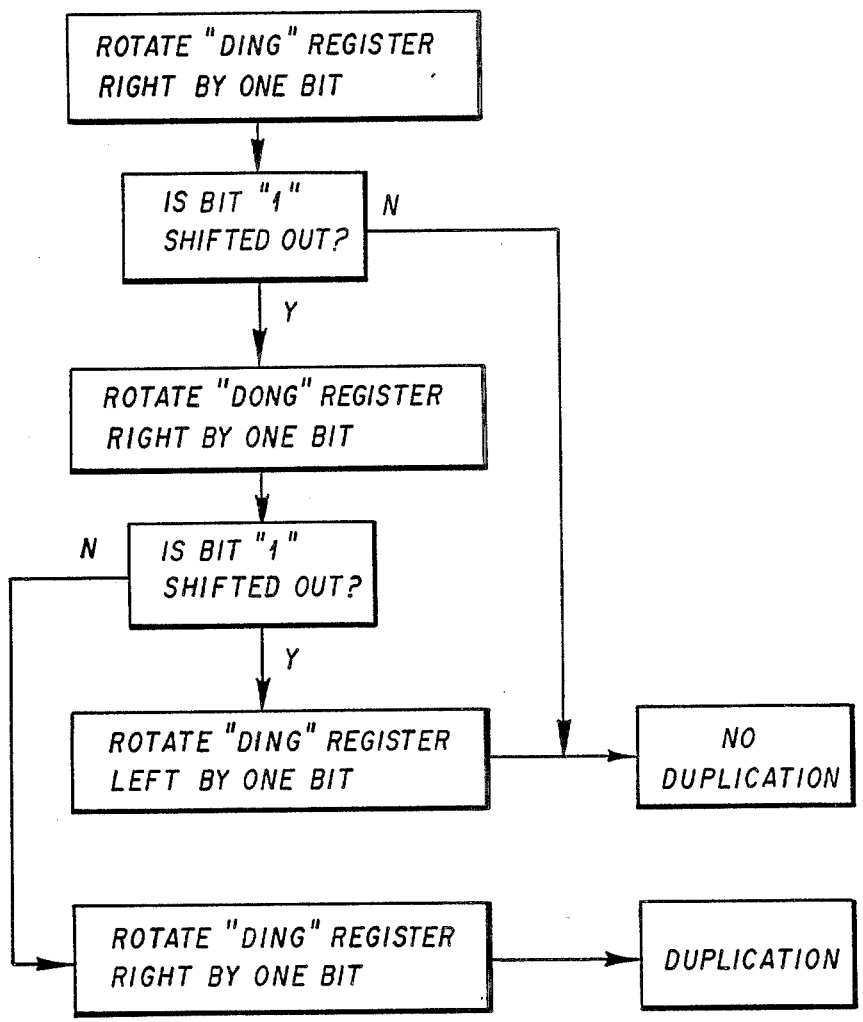
FIG. 4c is a flow diagram of an x-duplication machine.

After having gone through successive stages from A to C, and having accumulated the corresponding weights, if any, in register E according to the color of the source pels absorbed in succession, the process generates a complete target pel and further resets register E in Next Out as described in FIG. 4b.

The x-duplication machine is then used to decide whether to duplicate or not the last source pel absorbed as illustrated in FIG. 4c for a particular embodiment. If not, the process proceeds to the next target pel and loops to absorb one source pel of the current color through Next In in stage A. If a duplication occurs, the Next In step is by-passed and the process acts as if it had absorbed again the last source pel to have been absorbed in stage C.

This continues until an EOL signal is eventually generated. When the next BOL signal to be generated fails to bring a valid run length, the process terminates.

As shown in FIG. 5, upon issue of an EOL signal by the x-filtering machine, the process enters the y-skip machine to decide whether to output an actual target line or not. The functioning of a y-skip machine is completely similar to that of an x-duplicating machine, except for its interpretation.

If actual target output is skipped, the buffers B holding the sy intermediate lines characterizing the y-filtering machine are rotating by one count, always in the same direction. For example, if the register E of FIG. 4 had been stored into B1, after rotation it is put in contact with B2. Similarly, if B1 had been in contact with S1, B2 with S2 B3 with S3, after rotation B1 is in contact with S3, B2 with S1 and B3 with S2.

Note that the Buffers B are first-in, first-out buffers accumulating entire lines of nx intermediary target results.

If actual target output is not skipped, a simple loop processes all the intermediate results of buffers B. Until the buffers have been processed, a sy tuplet is moved past the shifters Si which have been activated or not at initialization time; the sy tuplet is then added together to yield a value, which may or may not be transformed according to a color mapper, into a final target pel. The presence of a color mapper is required when the range of possible outputs is wider than the range of allowable grey pel values. The final pel is stored into the target bit-map addressed in video scan order. The exact manner in which this happens is not particularly relevant to the process. An end of output medium check can be inserted at this place to terminate the process.

When the buffers B have been processed, the buffers are rotated as under the skip condition.

After rotation, a BOL signal is issued to the attention of the x-filtering machine.

The process as described above has been centered around the structure of the target pel and its associated filter domain sx X sy. Its x-filtering machine as depicted in FIG. 4 is structured as the sx x-dimension of the filter domain. The size sx being fixed, it is necessary to monitor overlaps between two consecutive domains with an x-duplication submachine. The process may be improved by centering it around the source runs. Using the notations previously defined, in the x-direction.

Figure 6A:
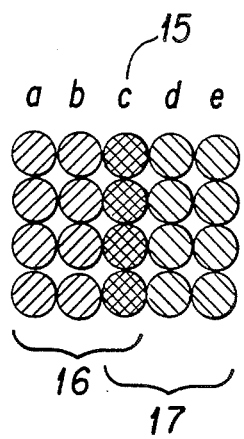
FIGS. 6a, 6b, 6c and 6d are illustration of the effect of the variable-breadth filtering process.
Figure 6B:
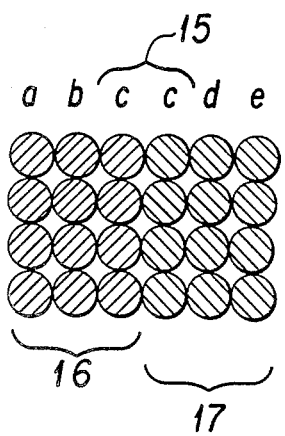
Figure 6C:
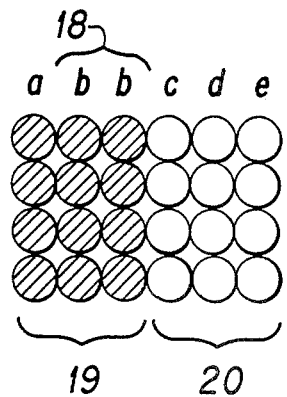
Figure 6D:
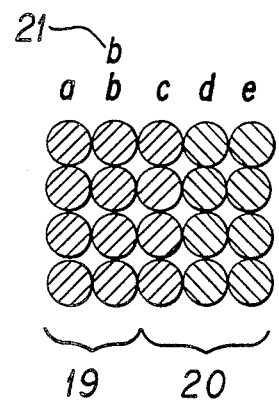

$m = nq + r$ $o < r < n$ and $s = q + 1$; $n - r$ source pels duplications are called for. But instead of constraining them to occur between two consecutive target pel filter domains, let the $n - r$ source pel duplications occur anywhere in the most evenly fashion among the m source pels. This is akin to allowing the breadth of the filter domain to potentially shrink by 1 and double the weight of one of the two remaining source pels as illustrated in FIGS. 6a-6d. The duplication of a source pel 15, shown between two target pels 16, 17 in FIG. 6a, is equivalent to the stretching of the source pel 16 shown in FIG. 6b. The stretching of a source pel 18, among target pels 19, 20 as illustrated in FIG. 6c, is equivalent to the shrinking of the domain of the target pel 19, while doubling the weight of the stretched pel 21.

Now, it becomes possible to stretch each run in x as it comes, independently of target pels. The stretched run is subsequently converted into a run of target pels all at once. Because there are in general many less source runs than target pels, the latter approach is much faster than the former.

The improved process is therefore characterized by: (a) the reference to a finite support filter as previously defined; (b) the computation of the number of x-duplications of source pels through this reference; (c) the subsequent stretching of source pels in the x direction independently of target pels; (d) the direct transformation of stretched source runs into target runs.

Note that the choice of weights is identical in both implementations.

To keep with previous definitions, $n - r$ overlaps are spread over m source pels, which is akin to drawing a digital straight line from $(0,0)$ to $(m, m - n + r)$, or equivalently $(m, n - r)$ where the $(n - r)$ overlaps correspond to the $(n - r)$ $(+1, +1)$ moves.

Both implementations share the architecture described in FIG. 3. Only differences between the two is explained below.

The computations of the filter size sx, sy and weights are unchanged.

If mx is an exact multiple of nx, the stretching mechanism which replaces the previous overlap mechanism is bypassed. If a remainder rx occurs, a stretching mechanism is used to generate nx-rx duplicated source pels as evenly spread as possible over the m original ones.

The computations made for the y direction are the same as before. A major difference between the two implementations is the use, in the improved version of a different x-filtering machine and consequently replacing the x-duplication machine by an x-stretch machine.

Figure 7:
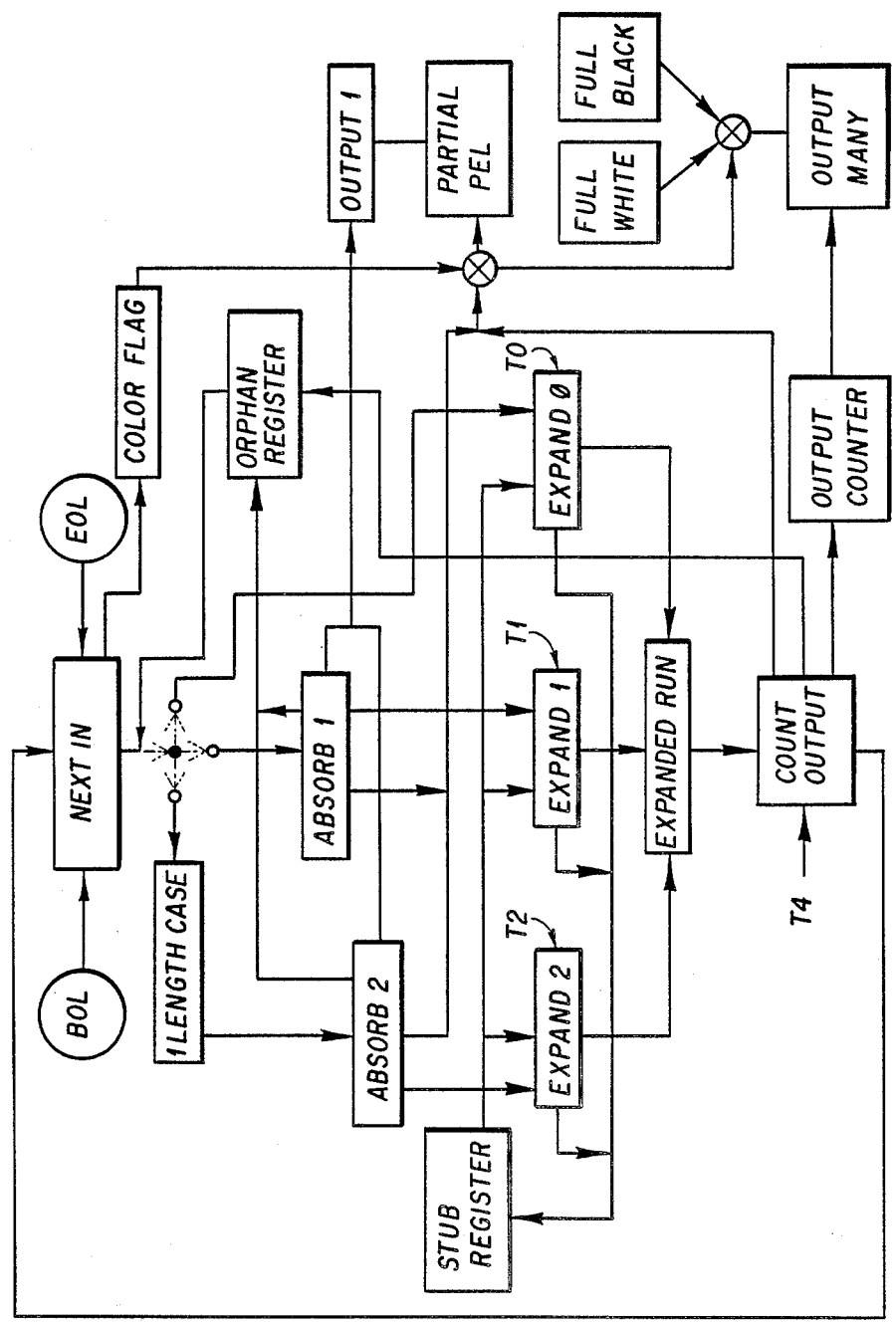
FIG. 7 is a flow diagram of an improved x-filtering machine.

FIG. 7 presents the new x-filtering machine for sx=3, with the data registers shown in thicker lines. Equivalent x-filtering machines for any sx can be easily constructed from this model by setting the number of so-called expansion and absorption components to sx and sx−1 respectively.

The initialization of the x-filtering machine is done by loading the quantity $$\sum_{i=sx-p+1}^{sx} u(i)$$

into a permanent register within the component "Absorb p", for p=1, ... sx−1. These registers are not detailed in FIG. 7. The sx−1 quantities $$\sum_{i=1}^{q} u(i),$$

for q=1, ... sx−1, are also loaded into permanent registers within the component "Count output". These registers are not detailed in FIG. 7.

Finally, the quantities 0 (if white is 0) and $$\sum_{i=1}^{sx} u(i)$$

are loaded into the "full white" and "full black" registers respectively.

Once initialized properly, the improved system relies on the delivery on demand of the next current run length in the x-direction of the input signal, as can be obtained for example from a decoding stage of the modified Huffman code of the CCITT Group III facsimile standard. After reaching this component, the process first generates a beginning of line signal.

When the beginning of line (BOL) signal is generated, the "color flag register" is reset to black (1), the "stub register" is reset to its initial value according to the x-stretch mechanism chosen, the "orphan register" is reset to 0 and the "partial pel register" is reset to zero.

The "Next In" subprocess simply fetches the next current run into an internal register (this register is not detailed in FIG. 7) and updates the "color flag register" according to the run coding convention. If the current run turns out to be an End of Line, according to the run coding convention, the "Next In" subprocess generates an End of Line (EOL) signal.

According to the value q (0,1. . . sx−1) of the "orphan register", the flow of control either passes directly to the "Expand/0" component (for q−0) or is first routed to the "Absorb p" component with p=sx-q.

The "Absorb p" component is used to complete a group of consecutive left over source pels which is too small to form a target pel. Assuming the value of this partial target pel is held in the "partial pel register", the "Absorb p" component adds to the "partial pel register" the value of its permanent register (not detailed in FIG. 7), conditioned on the current value of the "color flag register" (if white is 0, no addition occurs when flag is set to white). The "Absorb p" component further instructs the "Output 1" component to release the contents of the "partial pel register" (now containing a complete target pel) to the storage structure described in FIG. 5. Finally the "Absorb p" component resets to zero the "orphan register" and the "partial pel register", and subtracts p from the value of the current run, which is then passed on to the "Expand/p" component.

Whenever a run of length less than p is passed to an "Absorb/p" component, a gate-keeper component (such as the "1 length case" component for the "Absorb 2" of FIG. 7) is necessary to process those special cases in an adhoc way.

The x-stretch machine is made out of the expansion components of FIG. 7. The function of "Expand/p" (p=0, . . . sx−1) is:
  given a state i, representing the cumulative influence of past runs,
  and a run length L, which results from the absorption of the first p pels from a new run (of original length L+p), to determine:
  the new state i′, including the influence of the present run.
  and the expanded run length L′.

A possible construction for "Expand/0" is to fill a table T0 of length mx+1, with, in position k, the number D of duplications (or stretches) to be added before position k+1. Since D(k) is the ordinate of a digital straight line going from (0,0) to (mx, nx-rx) corresponding to abscissa k, the table T0 can be obtained using any digital straight line drawing method.

The state i is then made out of the cumulative addition of past runs so far, initialized to 0. "Expand/0" then carries on the operation:

$$i' = i + L$$
$$L' = L + D(i') - D(i)$$

The stub register is used to memorize the state i of the expansion.

With this construction the different components "Expand/p" can share the same table and be folded into a unique operation:

$$i' = i + L + p$$
$$L' = L + D(i') - D(i)$$

Further simplicity is achieved by specializing the machine to a particular scale factor whenever the application allows. For example, $$mx = 1728 \; nx = 640 \; rx = 448 \; nx - rx = 192$$
$$mx/(nx - rx) = 9;$$

in that case the state i can be taken modulo 9, the table T0 can be replaced by one giving for each L, its quotient Lq and remainder Lr by 9. The Expand/p operation becomes:

$$i' = i + Lr + p$$
$$L' = L + Lq$$
$$\text{while } (i' \geq 9) \; do \; \{i' = i' - 9; L' = L' + 1\}.$$

The "Expand/p" components carry out the x-stretch mechanism described earlier. Each takes two inputs: the current run and a cumulative state recorded in the "stub register". Each generates two outputs: a new value for the current run which takes expansion into account, recorded in the "expanded run register", and an updated state recorded in the "stub register". It has already been noted that a possible implementation of these components rely on tables T0 . . . T(sx−1) and that all components may be advantageously implemented as a single general component accepting "p" as an input.

Given an expanded run of source pels, the "Count Output" component performs on it a division by sx. For values like sx=2,4, this division is performed as shift. For other values like sx=3, the preferred method is to use a table. The resulting quotient is then stored in the "output counter" and the remainder q in the "orphan register", while the internal value $$\sum_{i=1}^{q} u(i)$$

is added to the "partial pel register", conditioned on the current value of the "color flag register". The "Count Output" further instructs the "Output Many" component to release the contents of either its "full white" or "full black" register, conditioned on the current value of the "color flag register", to the storage structure described in FIG. 5, as many times as indicated in the "output counter". Finally, control is passed back to the "Next In" component.

This continues until an EOL signal is eventually generated. When the next BOL signal to be generated brings successive EOLs, the process terminates.

The filtering of intermediate results in y until the end of output follows the previously described process illustrated in FIG. 5. This process is best applied to display onto a graphic monitor a fast and readable representation of documents such as 8½"×11" pages, digitized at a higher resolution and encoded by a method such as CCITT Group III facsimile.

When the pel values resulting from the two processes described in the present application are represented by appropriate grey scale levels on a graphics monitor, typically from 0 to 15, whether directly or through the use of a color mapper (see FIG. 5), the quality of the representation is much better than with other known methods using black and white output.

Other applications come from using the pel values as an input to any further decision-making process. For example:

a thresholding process, which leads back to less resolution in grey (8 levels, 4 levels, 2 levels). The 2 levels case gives back a black and white output;

an addressing mechanism which stores the target pels thus computed into a geometric pattern different from the regular video scan order. When this pattern is, for example, a rectangular grid set at an angle from the regular video scan grid, the result is to rotate (unskew) the original picture.

Again, other applications come from departing from the set of weights suggested in the earlier description, so as to affect image processing operations combined with the scaling down inherent to the invention principle.

Other applications come from allowing the source pels to be themselves grey-scale in value. In the weighting process, multipliers or shifters are then introduced together with the original adders.

Though the main application is designed to enhance monitor display, it can be applied to any device whose output is a document to be represented using grey-scale pels, including black-and-white printers after a thresholding process.

Finally, the size of the input document can be very small and the process used to generate grey-scale templates from a typographic font library decoded as black and white runs, for the purpose of antialiasing characters on displays.

Two major other architectures can be achieved without changing the fundamental characteristics of the invention.

In the improved implementation, the x-filtering machine can be specialized to one particular run length and as many instances of these simplified machines can be implemented, one for each possible length generated by the input signal. The run length input can be thought of as an index into a table of specialized filtering machines. Though less compact than the architecture earlier described, this distributed architecture can achieve a greater speed.

In both implementations, the process is divided into an x-filtering stage and a y-filtering stage, themselves sandwiched between an earlier decoding process of the input signal into run lengths and a later storing process of the target pel generated. It is possible to combine these four stages with several levels of integration or parallelism. With this modified architecture, the input of one stage is processed by the next stage as soon as it becomes available without buffering an entire line of run lengths or temporary output pels. Because the y-filtering stage requires several lines of temporary output pels to output one actual output line, there is still need for the line buffers B but once again a faster speed can be achieved this way especially in a hardware implementation.

Finally, and notwithstanding the last comment, nothing in the invention prevents either software or hardware implementation.

While the preferred embodiment of the invention has been described, and modifications have been suggested, other embodiments may be devised in a variety of applications within the spirit of the invention and the scope of the appended claims.

What is claimed is:

1. In the processing of a digitized image, such as the facsimile transmission and reproduction of documents, an apparatus for linearly reducing a compressed digital source signal of an image, said source signal comprising an orderly sequence of black or white information source pels grouped into lines having source runs of single or successive source pels of the same color, into a target signal suitable for display and printout on output devices having a coarser line resolution than an input device used to generate said digital coding, said apparatus comprising:

a filter for successively selecting and adjusting clusters of source pels in compressed form from at least one line of said source signal; and means for translating each of said clusters into a grey-scaled target signal pel having a grey-scale weight proportional to the combined grey-scale weights of the source pels within said cluster.

2. In the processing of a digitized image, such as the facsimile transmission and reproduction of documents, an apparatus for linearly reducing a compressed digital source signal of an image, said source signal comprising an orderly sequence of black or white information source pels grouped into lines having source runs of single or successive source pels of the same color, into a target signal suitable for display and printout on output devices having a coarser line resolution than an input device used to generate said digital coding, said apparatus comprising:

a filter for successively selecting and adjusting clusters of source pels from at least one line of said source signal; and means for translating each of said clusters into a target signal pel having a grey-scale weight proportional to the combined grey-scale weights of the source pels within said cluster; wherein said filter comprises:

means for determining the overall breadth of the domain of said filter; and means for computing a minimum number of required source pel duplications as a function of said overall breadth and the length of said line.

3. The apparatus of claim 2, wherein said means for adjusting clusters comprises means for aligning the position of the domain of said filter over source pels as a function of the position of the target pels within each line in order to evenly localize said duplications of source pels as overlaps between two adjacent domains.

4. The apparatus of claim 2, wherein said filter comprises:

means for aligning the position of the domain of said filter and for varying the overall breadth of said filter as a function of the position of the target pel within each line by stretching each source run as necessary to cumulatively and evenly distribute said duplication of source pels over the length of each line.

5. The apparatus of claim 4 which further comprises means for processing fractions of two successive source runs falling into one said filter domain.

6. The apparatus of claim 5 which further comprises means for converting the remaining of said stretched source run into a target run.

7. The apparatus of claim 3, wherein said filter further comprises:
   means for recognizing that the number of source pels within a line is an exact multiple of the corresponding number of target pels; and
   means, responsive to said means for recognizing, for bypassing said means for aligning.

8. The apparatus of claim 2, wherein said means for translating further comprise means for computing the grey-scale weight (W) of each target pixel wherein:

$$W = u(i)\,v(j) = \sum_{j=i}^{sy} v(j) \times \left[ \sum_{i=1}^{sx} u(i)\,\text{input}\,(i,j) \right]$$

with $1 \leq i \leq s\,x$ and $1 \leq j \leq sy$
   wherein sx and sy represent the breadth of the source pel cluster defined by the domain of the filter;
   the weight v(j) is either 1 or 2; and
   input (i,j) equal 0 or 1.

9. The apparatus of claim 8 which further comprises means to non-linearly translate said gray-scale weight into a color map index.

10. The apparatus of claim 4, wherein said filter further comprises:
   means for recognizing that the number of source pels within a line is an exact multiple of the corresponding number of target pels; and
   means, responsive to said means for recognizing, for bypassing said means for aligning.

* * * * *